(12) United States Patent
Kresse

(10) Patent No.: US 7,499,784 B2
(45) Date of Patent: Mar. 3, 2009

(54) METHOD OF SELECTING A TRANSMISSION SHIFT SCHEDULE

(75) Inventor: John P. Kresse, Martinsville, IN (US)

(73) Assignee: General Motors Corporation, Detroit, MI (US)

( * ) Notice: Subject to any disclaimer, the term of this patent is extended or adjusted under 35 U.S.C. 154(b) by 141 days.

(21) Appl. No.: 11/733,164

(22) Filed: Apr. 9, 2007

(65) Prior Publication Data

US 2008/0249693 A1   Oct. 9, 2008

(51) Int. Cl.
*G06F 17/00* (2006.01)
(52) U.S. Cl. .............................. 701/61; 701/51; 701/55; 477/110; 477/111
(58) Field of Classification Search .................. 701/51, 701/55, 61, 62, 64; 477/110, 111, 120, 162, 477/904
See application file for complete search history.

(56) References Cited

U.S. PATENT DOCUMENTS

| 5,720,696 A | * | 2/1998 | Robinson | 477/120 |
| 6,991,584 B2 | * | 1/2006 | Cowan | 477/110 |
| 2008/0027613 A1 | * | 1/2008 | Bai et al. | 701/55 |

* cited by examiner

*Primary Examiner*—Gertrude Arthur Jeanglaud

(57) ABSTRACT

A method for selecting a shift schedule for a transmission in a motor vehicle is provided. The method includes the steps of determining whether a signal-to-noise ratio exceeds a threshold and calculating a tractive effort of the motor vehicle. A vehicle mass and a road grade is then estimated from the tractive effort using a recursive least squares estimator with multiple forgetting when the signal-to-noise ratio exceeds the threshold. A vehicle mass is selected and the road grade estimated from the vehicle mass and tractive effort when the signal-to-noise ratio does not exceed the threshold. A shift schedule is then selected based on the vehicle mass and the estimated road grade.

16 Claims, 4 Drawing Sheets

| Row Number | Level of Convergence | Effect on Mass Estimate Part of RLS | Effect on Grade Estimate Part of RLS | Effect on Accumulation of Tractive Effort Data in RLS | Condition for Transitioning to Next Level of Convergence |
|---|---|---|---|---|---|
| 1 | Unconverged | Large Change $\lambda1=0.04$ | Very small change $\lambda2=0.99$ | no accumulation | engine and transmission temps warm up |
| 2 | Fast | Large Change $\lambda1=0.04$ | Very small change $\lambda2=0.99$ | accumulation allowed | Run estimator a number of times with good data |
| 3 | Med | Small Change $\lambda1=0.85$ | Large change $\lambda2=0.45$ | accumulation allowed | A number of similar mass estimates using different data sets with very good data |
| 4 | Slow | Very small change $\lambda1=0.96$ | Large change $\lambda2=0.2$ | accumulation allowed | |

FIGURE 3

METHOD OF SELECTING A TRANSMISSION SHIFT SCHEDULE

FIELD

The present disclosure relates to transmissions, and more particularly to a method for selecting a transmission shift schedule in a motor vehicle.

BACKGROUND

The statements in this section merely provide background information related to the present disclosure and may or may not constitute prior art.

A motor vehicle having an automatic transmission includes a control scheme of shift schedule for determining when the automatic transmission shifts from one gear ratio to another gear ratio based on a plurality of factors. These factors typically include, but are not limited to, engine torque, vehicle speed and accelerator pedal position. Any given shift schedule for a motor vehicle balances fuel economy versus performance, and so any given shift schedule may be categorized as an economy shift schedule or a performance shift schedule based on the balance that characterizes the shift schedule.

For a given trip in a motor vehicle, there are times when fuel economy is preferred over high-performance and other times when high-performance is preferred over fuel economy. Accordingly, it is desirable to have the ability to transition between various shift schedules, such as between an economy shift schedule and a performance shift schedule, based on given driving conditions. However, it can be difficult to automatically determine which shifting schedule is desired due to variability in driving conditions, such as road grade, and vehicles parameters, such vehicle mass. Accordingly, the present invention provides a method for selecting a shift schedule using estimated road grade and vehicle mass.

SUMMARY

The present invention provides a method for selecting a shift schedule for a transmission in a motor vehicle.

In one aspect of the present invention, the method includes the steps of determining whether a signal-to-noise ratio exceeds a threshold and measuring a tractive effort of the motor vehicle. A vehicle mass and a road grade is then estimated from the tractive effort using a recursive least squares estimator with multiple forgetting when the signal-to-noise ratio exceeds the threshold. A vehicle mass is selected and the road grade estimated from the vehicle mass and tractive effort when the signal-to-noise ratio does not exceed the threshold. A shift schedule is then selected based on the vehicle mass and the estimated road grade.

In another aspect of the present invention the signal-to-noise ratio is an acceleration of the vehicle when an engine torque is not approximately zero.

In yet another aspect of the present invention the tractive effort is calculated from measured vehicle speed, measured engine torque, and transmission control signals.

In yet another aspect of the present invention the recursive least squares estimator includes forgetting factors that modify the vehicle mass and the road grade.

In still another aspect of the present invention the step of estimating the vehicle mass and the road grade using the recursive least squares estimator includes varying the value of the forgetting factors based on the signal-to-noise ratio.

In yet another aspect of the present invention the recursive least squares estimator holds the road grade near constant and calculates the vehicle mass from the tractive effort when the motor vehicle is in a startup condition.

In yet another aspect of the present invention the startup condition begins when the vehicle is first started and ends when the engine and transmission temperatures increase to a pre-defined amount.

In still another aspect of the present invention the recursive least squares estimator accumulates tractive effort calculations over time, holds the road grade near constant, and calculates the vehicle mass from the tractive effort when the startup condition has ended.

In still another aspect of the present invention the recursive least squares estimator accumulates tractive effort calculations over time, allows the road grade value to change, and allows the vehicle mass to change when the signal-to-noise ratio exceeds the threshold and the calculated vehicle mass is within an allowable limit.

In yet another aspect of the present invention the recursive least squares estimator accumulates tractive effort calculations over time, allows the road grade value to change, and holds the vehicle mass near constant when the signal-to-noise ratio exceeds the threshold, the calculated vehicle mass is within an allowable limit, and engine torque is above a calibrated value.

In yet another aspect of the present invention the step of selecting a vehicle mass includes selecting a vehicle mass from the last vehicle mass calculated by the recursive least squares estimator when the signal-to-noise ratio exceeded the threshold.

In yet another aspect of the present invention the step of selecting a shift schedule includes selecting between an economy shift schedule and a performance shift schedule.

In yet another aspect of the present invention the method includes the step of calculating a road load mass factor from the vehicle mass, the road grade, and acceleration due to gravity prior to selecting a shift schedule.

In yet another aspect of the present invention the method includes the step of normalizing the road load mass factor and selecting a shift schedule based on the normalized road load mass factor.

In yet another aspect of the present invention a performance shift schedule is selected when the vehicle mass and road grade are unknown.

In yet another aspect of the present invention the signal-to-noise ratio is less than the threshold when the motor vehicle is braking.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a table illustrating various levels of convergence used by the method of the present invention.

DETAILED DESCRIPTION

The following description is merely exemplary in nature and is not intended to limit the present disclosure, application, or uses.

Figure 1A:
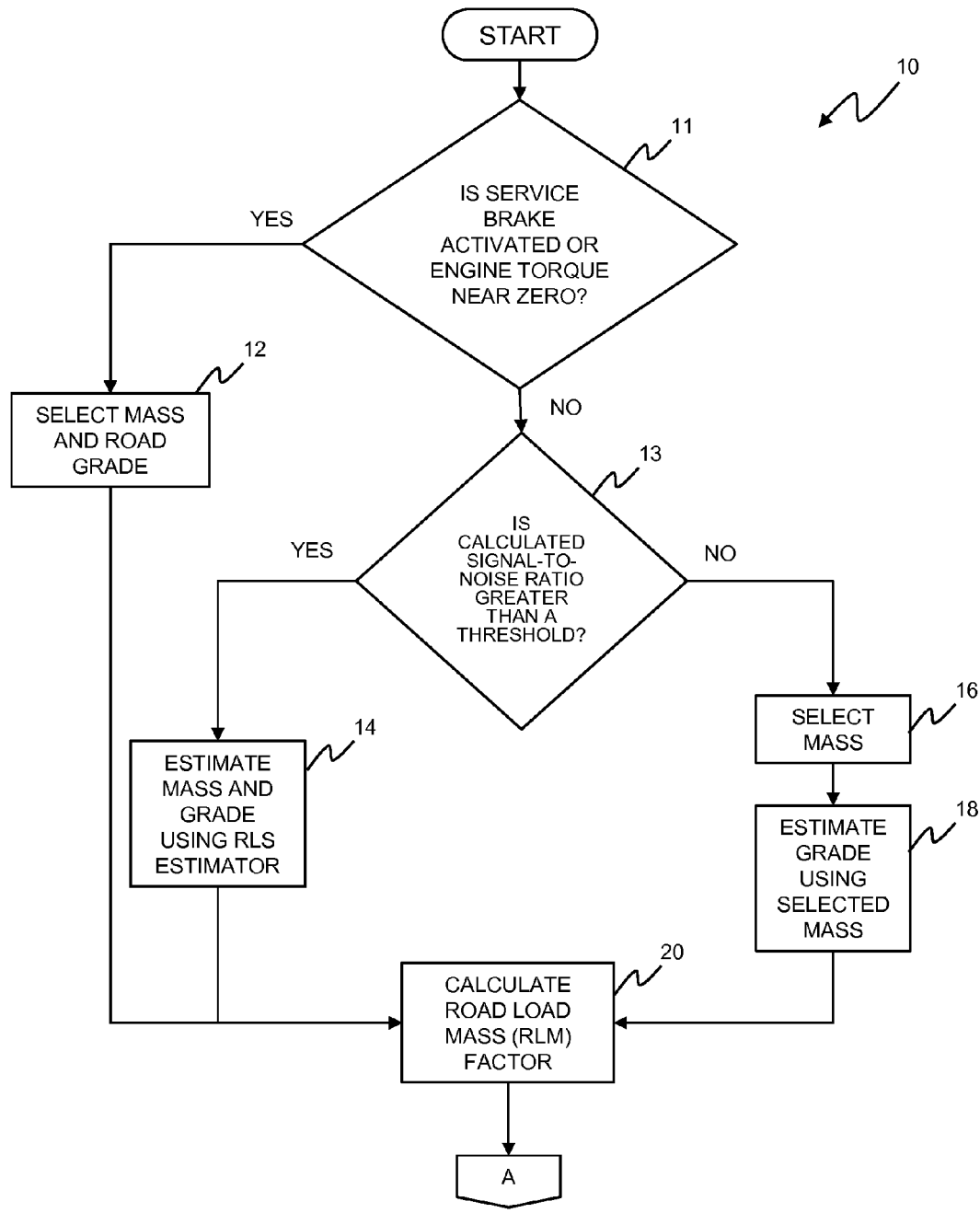
FIGS. 1A and 1B is a flow chart illustrating a method of selecting a shift schedule according to the principles of the present invention.
Figure 1B:
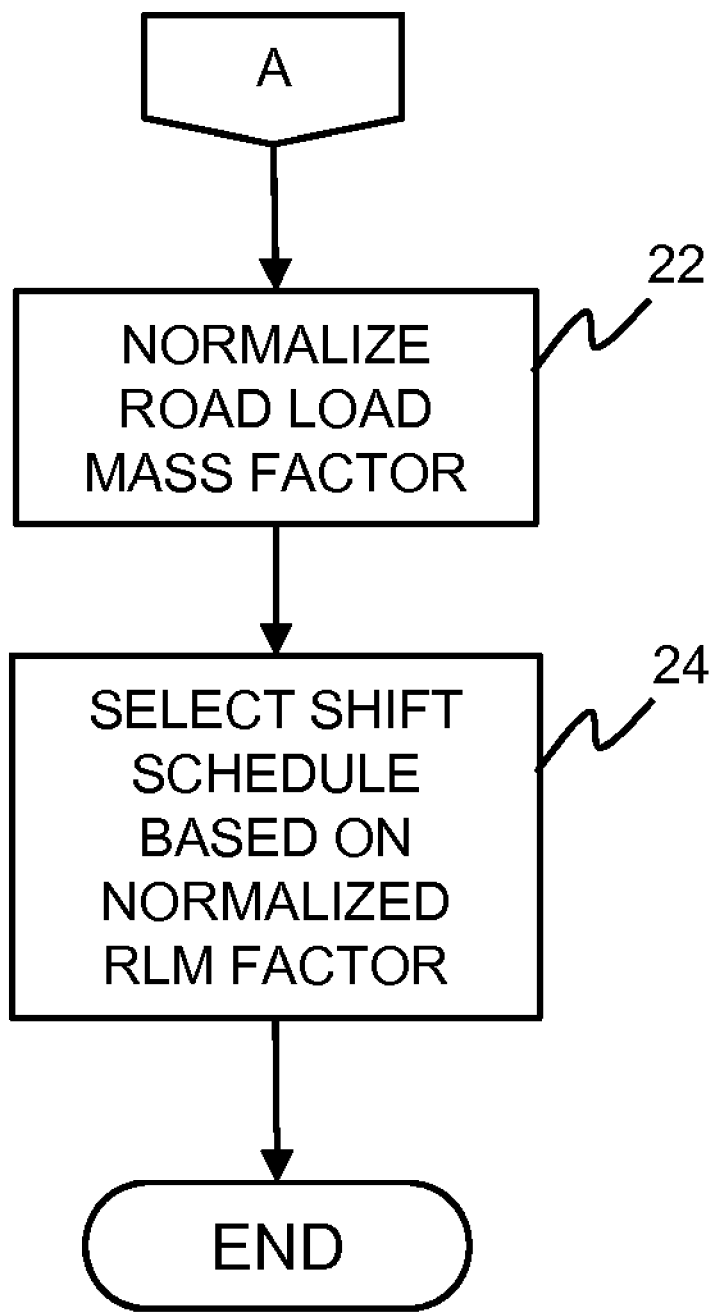

With reference to FIGS. 1A and 1B, a method for selecting a shift schedule for an automatic transmission in a motor vehicle is generally indicated by reference number 10. The motor vehicle (not shown) generally includes a powertrain having an engine and an automatic transmission. As the motor vehicle travels, the grade of the road may vary from a flat grade to a steep grade, depending on the given route. Additionally, the mass of the motor vehicle may change due to fluctuations in the amount of passengers, luggage, stored items, or the presence of trailers or other towed objects. The method 10 estimates the road grade and vehicle mass at any given instant in order to select a shift schedule that meets the needs of the operator of the motor vehicle. Accordingly, the method 10 runs continuously in real-time.

The method 10 begins at step 11 where a controller determines whether a service brake has been applied or whether engine torque is near zero net torque. The controller may be an engine controller or transmission controller, or any other electronic device having a preprogrammed digital computer or processor, control logic, memory used to store data, and at least one I/O section. The control logic includes a plurality of logic routines for monitoring, manipulating, and generating data. If the service brake has been applied or if engine torque is near zero, the method 10 proceeds to step 12 where a vehicle mass and road grade slowly filtered to zero are selected. The vehicle mass is taken from the last estimated vehicle mass calculated in a prior iteration of the method 10 when the signal-to-noise ratio exceeded a threshold. As such, it is assumed to be a fairly accurate vehicle mass. The road grade is taken from the last estimated road grade calculated in a prior iteration of the method 10 when the signal-to-noise ratio exceeded the threshold and. To slowly filter the last estimated road grade to zero, the road grade is passed through a first-order lag filter with a slow time constant, such as, for example, 15 seconds.

If the service brake has not been applied and/or the engine torque is not near zero, the method proceeds to step 13 where the controller determines whether a signal-to-noise ratio exceeds a threshold. The signal-to-noise ratio represents the quality of data measured from the motor vehicle. A good signal-to-noise ratio occurs when the acceleration is not equal to zero, the engine torque is not near zero, and/or there is no braking. The threshold is a pre-defined calibrated value.

If the calculated signal-to-noise ratio is greater than the threshold, then the method 10 proceeds to step 14 where vehicle mass and road grade are estimated using a Recursive Least Squares (RLS) estimator with multiple forgetting. The RLS estimator is a process or program that uses accumulation of measured data and multiple forgetting to calculate an estimated vehicle mass and an estimated road grade. A RLS estimator is described in "Recursive Least Squares with Forgetting for Online Estimation of Vehicle Mass and Road Grade: Theory and Experiments", by Vahidi, Stefanopoulou, and Peng, published in Vehicle System Dynamics, Vol. 43, No. 1 (January 2005), hereby incorporated by reference as if fully disclosed herein. The RLS estimator uses a plurality of measured vehicle parameters and known vehicle constants to estimate in real-time the vehicle mass and the current road grade that the vehicle is traveling on. The basic relationship between vehicle mass and road grade may be represented by the following equation:

$$Ma = ((T_e - J_e \omega)/r_g) - F_{fb} - F_{aero} - F_{grade}; \qquad (1)$$

wherein M is the mass of the vehicle, a is the acceleration of the vehicle calculated from the change in vehicle speed over time, $T_e$ is the engine torque, $J_e \omega$ is the portion of torque used to rotate the powertrain, $r_g$ is wheel radius divided by total gear ratio (constant for a given vehicle), $F_{fb}$ is the force of braking, $F_{aero}$ is the force do to aerodynamic drag, and $F_{grade}$ is the force due to the road grade. The actual road grade may be calculated from the following equation:

$$F_{grade} = M^* g^* (\mu^* \cos \beta + \sin \beta); \qquad (2)$$

wherein μ is the rolling resistance of the road and β is the road grade. Accordingly, β=0 corresponds to no road inclination, β>0 corresponds to an uphill grade, and β<0 represents a downhill grade. Other factors that may be employed to increase the accuracy of the estimation include input and output PTO activation status, engine coolant temperature, and fan torque loss. The RLS Estimator uses least recursive squares analysis with multiple forgetting with equation (1) to calculate in real-time an estimated vehicle mass (M) and an estimated road grade (β), as will be described in greater detail below.

If the calculated signal-to-noise ratio is less than the threshold, then the method 10 proceeds to step 16 where the controller selects a vehicle mass. The selected vehicle mass is taken from the last estimated vehicle mass calculated at step 14 when the signal-to-noise ratio exceeded the threshold. As such, it is assumed to be a fairly accurate vehicle mass.

Next, an estimated grade is calculated using a grade estimator at step 18. The grade estimator uses the selected vehicle mass determined in step 16 to calculate the road grade from equation (1).

Once the vehicle mass and road grade have been estimated at either steps 11, 14, or step 18, a road load mass (RLM) factor is calculated at step 20. The RLM factor is calculated using the following equation:

$$\text{RLM factor} = M^*(1 + g^* \sin(\beta)). \qquad (3)$$

The RLM factor is then normalized at step 22 to either a "0" or a "1". If the vehicle is in a start-up condition where vehicle mass and road grade cannot be accurately estimated, the RLM factor is normalized to a default setting that corresponds to a performance shift schedule.

At step 24, a shift schedule is selected based on the normalized RLM factor calculated at step 22. In the particular example provided, a normalized RLM factor of "0" indicates that the transmission should use a performance shift schedule which optimizes shifting performance while a normalized RLM factor of "1" indicates that the transmission should use an economy shift schedule which optimizes fuel economy. Moreover, the present invention contemplates that any normalized RLM factor between "0" and "1" can be used to interpolate between the two shift schedules. Therefore, it should be appreciated that any normalized factor may correspond to a specific shift schedule. In addition, while in the particular example provided only two shift schedules have been employed, it should be appreciated that any number of shift schedules may be used so long as each shift schedule corresponds to a normalized value. During startup conditions where the vehicle is first turned on, a performance schedule is automatically selected.

Figure 2:
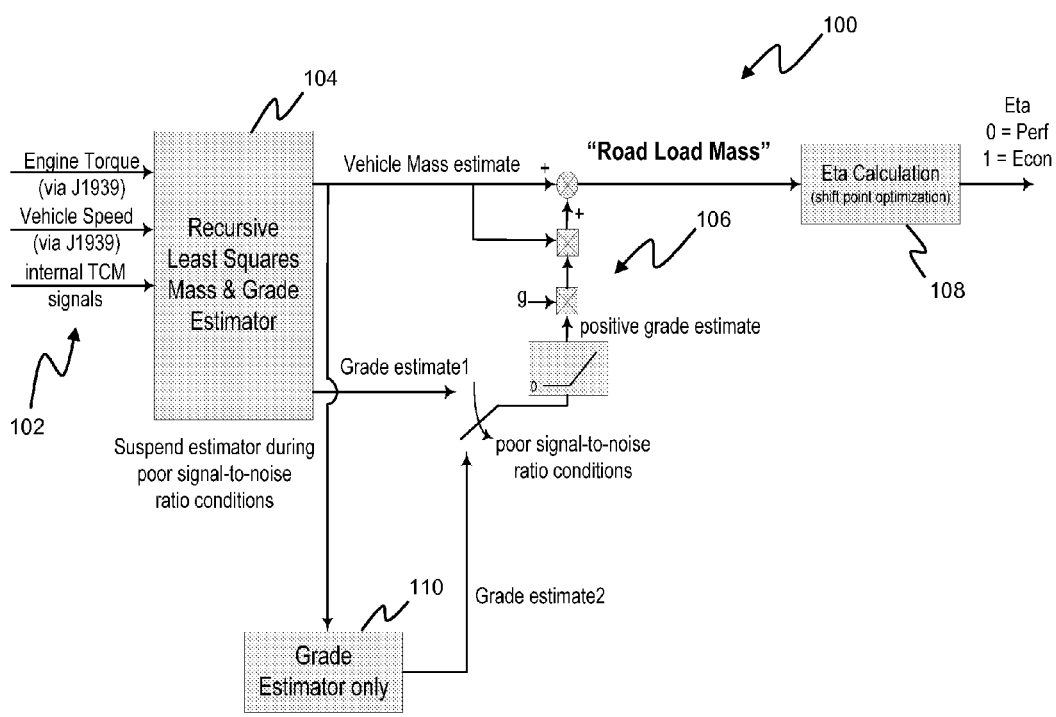
FIG. 2 is a control signal diagram of the method of selecting a shift schedule of the present invention.

Turning now to FIG. 2, a control signal diagram is indicated generally by reference number 100. The control signal diagram 100 is a algorithmic representation of the method 10 described in FIG. 1. The control signal diagram 100 includes a plurality of measured inputs 102 used to calculate the mass of the vehicle and the road grade. These inputs 102 include engine torque, vehicle speed, and internal transmission control module signals. An RLS estimator process 104 then uses the inputs 102 to estimate the vehicle mass and road grade using least recursive squares with multiple forgetting. As noted above, the RLS estimation process is described in the paper entitled "Recursive Least Squares with Forgetting for Online Estimation of Vehicle Mass and Road Grade: Theory and Experiments", by Vahidi, Stefanopoulou, and Peng. The multiple forgetting process includes assigning a scalar or weighted value to the vehicle mass and road grade in order to "forget" old data that may be less accurate. This scalar is referred to as a forgetting factor and is indicated by "$\lambda$" in the above referenced paper and in FIG. 3.

The RLS estimator 104 of the present invention changes these forgetting factors based on whether the vehicle has first started up and also on the quality of the signal-to-noise ratio. A table of these factors and conditions for transition from one level of convergence to another is shown in FIG. 3. For each level of convergence, two separate forgetting factors $\lambda$ are given. It should be appreciated that these forgetting factors $\lambda$ are exemplary and may be changed for a given application. At the first level of convergence during startup of the motor vehicle (Row 1), the road grade is held constant while the tractive effort is calculated with no accumulation of data. Since the mass of the vehicle is unknown at startup and the road grade is also unknown at startup, the RLS estimator 104 assumes the road grade does not change and attempts to calculate the vehicle mass from the measured tractive effort. The tractive effort corresponds to the summation of the inputs 102 used in equation (1). An accurate tractive effort may be calculated even when a torque converter is operating. The RLS estimator 104 at the first level of convergence (Row 1) allows the value of the vehicle mass to vary greatly as the tractive effort changes during driving.

Once the engine and transmission have warmed up (for example, to 25 to 30 degrees Celsius), the RLS estimator 104 transitions to the next level of convergence (Row 2). Here, road grade is held fairly constant, vehicle mass is allowed to vary, and accumulation of data over time is stored and used in subsequent calculations.

The RLS estimator 104 transitions to the next level of convergence (Row 3) once the RLS estimator has had a specified number of calculations with data taken when the signal-to-noise ratio exceeds the threshold value and the calculated vehicle mass falls within an allowable limit. This level of convergence reduces how widely the mass of the vehicle changes while allowing the road grade to have a larger change.

Finally, the RLS estimator 104 transitions to the fourth level of convergence (Row 4) when a specified number of similar vehicle mass estimates have been calculated using different data sets over time. This occurs when there is a good signal-to-noise ratio and when engine torque is above a calibrated value during the entire dataset. In this level of convergence, the mass of the vehicle is held fairly constant, reflecting a high level of confidence that the changing measured tractive effort is due to change in road grade conditions, not a change in vehicle mass. Accordingly, the road grade is allowed to vary greatly as the tractive effort changes and accumulation of data continues.

Returning to FIG. 2, calculated vehicle mass estimates and road grade estimates are then processed through function 106 to calculate the road load mass factor. In the particular example provided, a minimum limiter is used to produce a positive grade estimate. However, this minimum limiter is optional and may be removed to allow a vehicle going downhill (negative grade slope) to select an economy shift schedule rather than a default performance shift schedule. An Eta or efficiency calculator 108 then normalizes the RLM factor to allow the transmission or powertrain controller to select the shift schedule, as previously described in FIG. 1.

Where the signal-to-noise ratio does not exceed the threshold, the RLS estimator 104 is suspended and a grade estimator 110 calculates the road grade from the tractive effort using the selected mass estimate from the most recent RLS estimate when the signal-to-noise ratio exceeded the threshold. The selected vehicle mass and calculated grade estimate are then processed by the function 106 and normalized by the Eta calculator 108.

The description of the invention is merely exemplary in nature and variations that do not depart from the gist of the invention are intended to be within the scope of the invention. Such variations are not to be regarded as a departure from the spirit and scope of the invention.

What is claimed is:

1. A method for selecting a shift schedule for a transmission in a motor vehicle, the method comprising the steps of:
   determining whether a signal-to-noise ratio exceeds a threshold;
   calculating a tractive effort of the motor vehicle;
   estimating a vehicle mass and a road grade from the tractive effort using a recursive least squares estimator with multiple forgetting when the signal-to-noise ratio exceeds the threshold;
   selecting a vehicle mass and estimating the road grade from the vehicle mass and tractive effort when the signal-to-noise ratio does not exceed the threshold; and
   selecting a shift schedule based on the vehicle mass and the estimated road grade.

2. The method of claim 1 wherein the signal-to-noise ratio is an acceleration of the vehicle when an engine torque is not approximately zero.

3. The method of claim 2 wherein the tractive effort is calculated from measured vehicle speed, measured engine torque, and transmission control signals.

4. The method of claim 3 wherein the recursive least squares estimator includes forgetting factors that modify the vehicle mass and the road grade.

5. The method of claim 4 wherein the step of estimating the vehicle mass and the road grade using the recursive least squares estimator includes varying the value of the forgetting factors based on the signal-to-noise ratio.

6. The method of claim 5 wherein the recursive least squares estimator holds the road grade near constant and calculates the vehicle mass from the tractive effort when the motor vehicle is in a startup condition.

7. The method of claim 6 wherein the startup condition begins when the vehicle is first started and ends when the engine and transmission temperatures increase to a pre-defined amount.

8. The method of claim 6 wherein the recursive least squares estimator accumulates tractive effort calculations over time, holds the road grade near constant, and calculates the vehicle mass from the tractive effort when the startup condition has ended.

9. The method of claim 8 wherein the recursive least squares estimator accumulates tractive effort calculations over time, allows the road grade value to change, and allows the vehicle mass to change when the signal-to-noise ratio exceeds the threshold and the calculated vehicle mass is within an allowable limit.

10. The method of claim 9 wherein the recursive least squares estimator accumulates tractive effort calculations over time, allows the road grade value to change, and holds the vehicle mass near constant when the signal-to-noise ratio exceeds the threshold, the calculated vehicle mass is within an allowable limit, and engine torque is above a calibrated value.

11. The method of claim 5 wherein the step of selecting a vehicle mass includes selecting a vehicle mass from the last vehicle mass calculated by the recursive least squares estimator when the signal-to-noise ratio exceeded the threshold.

12. The method of claim 11 wherein the step of selecting a shift schedule includes selecting between an economy shift schedule and a performance shift schedule.

13. The method of claim 12 further comprising the step of calculating a road load mass factor from the vehicle mass, the road grade, and acceleration due to gravity prior to selecting a shift schedule.

14. The method of claim 13 further comprising the step of normalizing the road load mass factor and selecting a shift schedule based on the normalized road load mass factor.

15. The method of claim 1 wherein a performance shift schedule is selected when the vehicle mass and road grade are unknown.

16. The method of claim 1 wherein the signal-to-noise ratio is less than the threshold when the motor vehicle is braking.

* * * * *